(12) United States Patent
Reddy Bovilla et al.

(10) Patent No.: US 10,090,913 B2
(45) Date of Patent: Oct. 2, 2018

(54) AUTOMATIC BANDWIDTH ADJUSTMENT ON MULTI-FIBER OPTICS

(71) Applicant: Juniper Networks, Inc., Sunnyvale, CA (US)

(72) Inventors: Krishna Reddy Bovilla, Bangalore (IN); Sunil Ramachandra Rao, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 56 days.

(21) Appl. No.: 15/229,683

(22) Filed: Aug. 5, 2016

(65) Prior Publication Data

US 2016/0344470 A1    Nov. 24, 2016

Related U.S. Application Data

(63) Continuation of application No. 14/319,448, filed on Jun. 30, 2014, now Pat. No. 9,413,454.

(51) Int. Cl.

| | |
|---|---|
| *H04B 10/00* | (2013.01) |
| *G02F 2/00* | (2006.01) |
| *H04B 10/08* | (2006.01) |
| *H04B 17/00* | (2015.01) |
| *H04B 10/03* | (2013.01) |
| *H04L 12/24* | (2006.01) |
| *H04L 12/26* | (2006.01) |

(52) U.S. Cl.
CPC ......... *H04B 10/03* (2013.01); *H04L 41/0896* (2013.01); *H04L 41/0213* (2013.01); *H04L 43/16* (2013.01)

(58) Field of Classification Search
USPC .............. 398/2, 5, 10, 13, 17, 27, 33, 38
See application file for complete search history.

(56) References Cited

U.S. PATENT DOCUMENTS 7,369,764 B1 * 5/2008 Sukegawa .......... H04B 10/0771
398/10
7,822,110 B1 * 10/2010 Doblar .................. H04B 3/466
375/224

(Continued)

OTHER PUBLICATIONS

Malpass et al., "Partial Fault Protection", IEEE 802.3 Higher Speed Study Group, Sep. 10-13, 2007, 17 pages.

(Continued)

*Primary Examiner* — David Payne
*Assistant Examiner* — Pranesh Barua
(74) *Attorney, Agent, or Firm* — Harrity & Harrity, LLP (57) ABSTRACT

A device is configured to store information indicating a threshold bandwidth with which a multi-lane link is permitted to operate. The device may establish the multi-lane link with a peer device. The multi-lane link may include multiple lanes used to communicate data with the peer device. The device may determine fault states for the lanes included in the multi-lane link. A fault state, for a particular lane, may indicate that the particular lane is faulty. The device may determine an available bandwidth for the multi-lane link based on the fault states for the lanes. The device may selectively terminate the multi-lane link or operate the multi-lane link at the available bandwidth based on whether the available bandwidth satisfies the threshold bandwidth.

20 Claims, 8 Drawing Sheets

(56) References Cited

U.S. PATENT DOCUMENTS

| | | | | |
|---|---|---|---|---|
| 8,310,373 | B2* | 11/2012 | Feight | H04B 10/116 324/500 |
| 8,798,454 | B2* | 8/2014 | Akasaka | H04J 14/0268 398/1 |
| 9,413,454 | B1 | 8/2016 | Reddy Bovilla et al. | |
| 2004/0100958 | A1* | 5/2004 | Peng | H04L 12/5602 370/392 |
| 2004/0228278 | A1* | 11/2004 | Bruckman | H04L 47/10 370/231 |
| 2006/0212775 | A1* | 9/2006 | Cypher | H03M 13/09 714/758 |
| 2006/0239271 | A1* | 10/2006 | Khasnabish | H04L 45/00 370/395.21 |
| 2008/0247752 | A1* | 10/2008 | Wang | H04B 10/07955 398/22 |
| 2008/0253295 | A1* | 10/2008 | Yumoto | H04L 43/0811 370/245 |
| 2009/0324222 | A1* | 12/2009 | Kunjidhapatham | H04L 45/02 398/58 |
| 2010/0014853 | A1* | 1/2010 | Astigarraga | H04B 10/07 398/9 |
| 2010/0162033 | A1* | 6/2010 | Ahn | G06F 11/2007 714/4.1 |
| 2010/0232786 | A1* | 9/2010 | Aoki | H04J 3/1658 398/19 |
| 2010/0246389 | A1* | 9/2010 | Toyoda | H04L 41/0677 370/226 |
| 2010/0322630 | A1* | 12/2010 | Takeuchi | H04J 3/1652 398/65 |
| 2010/0329112 | A1* | 12/2010 | Ahn | H04L 25/14 370/225 |
| 2011/0141883 | A1* | 6/2011 | Kim | H04L 41/0833 370/225 |
| 2011/0221593 | A1* | 9/2011 | Han | H04L 41/0896 340/540 |
| 2011/0255865 | A1* | 10/2011 | Brooks | H04L 1/203 398/27 |
| 2011/0261682 | A1* | 10/2011 | Han | H04L 12/413 370/225 |
| 2011/0317994 | A1* | 12/2011 | Akasaka | H04J 14/0256 398/2 |
| 2012/0066531 | A1* | 3/2012 | Shafai | H04W 52/0206 713/323 |
| 2012/0099424 | A1* | 4/2012 | Croot | H04L 12/2878 370/225 |
| 2012/0281541 | A1* | 11/2012 | Palmer | H04L 45/245 370/241 |
| 2014/0003283 | A1* | 1/2014 | Koenen | H04L 41/0896 370/254 |
| 2014/0078894 | A1* | 3/2014 | Han | H04L 41/0677 370/228 |
| 2014/0286634 | A1* | 9/2014 | Tsuiki | H04B 10/032 398/5 |
| 2016/0056886 | A1* | 2/2016 | Kitamura | H04Q 11/0062 398/5 |

OTHER PUBLICATIONS

Bialkowski et al., "Partial Fault Notification and Shared Protection within PBB-TE", IEEE 802.1 Meeting, San Francisco, Jul. 16-20, 2007, 8 pages.

* cited by examiner

FIG. 6C

AUTOMATIC BANDWIDTH ADJUSTMENT ON MULTI-FIBER OPTICS

RELATED APPLICATION

This application is a continuation of U.S. patent application Ser. No. 14/319,448, filed Jun. 30, 2014 (now U.S. Pat. No. 9,413,454), which is incorporated herein by reference.

BACKGROUND

A transmitter may transmit data over a multi-lane link by distributing the data over multiple lanes, which each have a particular bandwidth. The data may be reassembled at a receiver such that an effective bandwidth of the multi-lane link is equal to the sum of the bandwidth of each lane. For example, 100 gigabit (100 G) Ethernet may use ten lanes each having a bandwidth of 10 gigabit per second (Gbit/s). However, if one of the lanes is faulty, the data may not properly be reassembled by the receiver, and the entire multi-lane link may be silently terminated without notification even if healthy lanes still exist.

SUMMARY

According to some possible implementations, a device may store information indicating a threshold bandwidth with which a multi-lane link is permitted to operate. The device may establish the multi-lane link with a peer device. The multi-lane link may include multiple lanes used to communicate data with the peer device. The device may determine fault states for the lanes included in the multi-lane link. A fault state, for a particular lane, may indicate that the particular lane is faulty. The device may determine an available bandwidth for the multi-lane link based on the fault states for the lanes. The device may selectively terminate the multi-lane link or operate the multi-lane link at the available bandwidth based on whether the available bandwidth satisfies the threshold bandwidth.

According to some possible implementations, a computer-readable medium may store instructions, that when executed by a processor, may cause the processor to establish a multi-lane link with a peer device. The multi-lane link may include a plurality of lanes used to communicate data with the peer device. The instructions may cause the processor to determine fault states for the plurality of lanes included in the multi-lane link. At least one of the fault states may indicate a particular lane, of the plurality of lanes, is faulty. The instructions may cause the processor to determine an available bandwidth for the multi-lane link based on the fault states for the plurality of lanes. The instructions may cause the processor to selectively terminate the multi-lane link based on whether the available bandwidth satisfies a threshold bandwidth. The threshold bandwidth may indicate a minimum bandwidth with which the multi-lane link is permitted to operate.

According to some possible implementations, a method may include establishing, by a device, a multi-lane link with a peer device. The multi-lane link may include a plurality of lanes used to communicate data with the peer device. The method may include determining, by the device, fault states for the plurality of lanes included in the multi-lane link. At least one of the fault states may indicate a particular lane, of the plurality of lanes, is faulty. The method may including determining, by the device, an available bandwidth for the multi-lane link based on the fault states for the plurality of lanes. The method may include selectively operating, by the device, the multi-lane link at the available bandwidth based on whether the available bandwidth satisfies a threshold bandwidth. The threshold bandwidth may indicate a bandwidth with which the multi-lane link is permitted to operate.

DETAILED DESCRIPTION

The following detailed description of example implementations refers to the accompanying drawings. The same reference numbers in different drawings may identify the same or similar elements.

A maximum possible bandwidth of a multi-lane link may not always be needed to properly communicate data. Rather, a lower threshold bandwidth may be satisfactory to properly communicate the data. Accordingly, if one or more lanes in a multi-lane link become faulty, the multi-lane link may still be used at a reduced bandwidth by distributing the data to healthy lanes. However, if the reduced bandwidth falls below the threshold bandwidth, the multi-lane link may become unsatisfactory for communicating the data, and the entire multi-lane link may be terminated.

Implementations described herein may allow a multi-lane link to operate at a reduced bandwidth when lanes become faulty. However, in some implementations, the multi-lane link may be terminated if an available bandwidth fails to satisfy a threshold bandwidth, thus ensuring the multi-lane link operates at a satisfactory bandwidth. Accordingly, service outages may be minimized while maintaining a satisfactory bandwidth.

Figure 1:
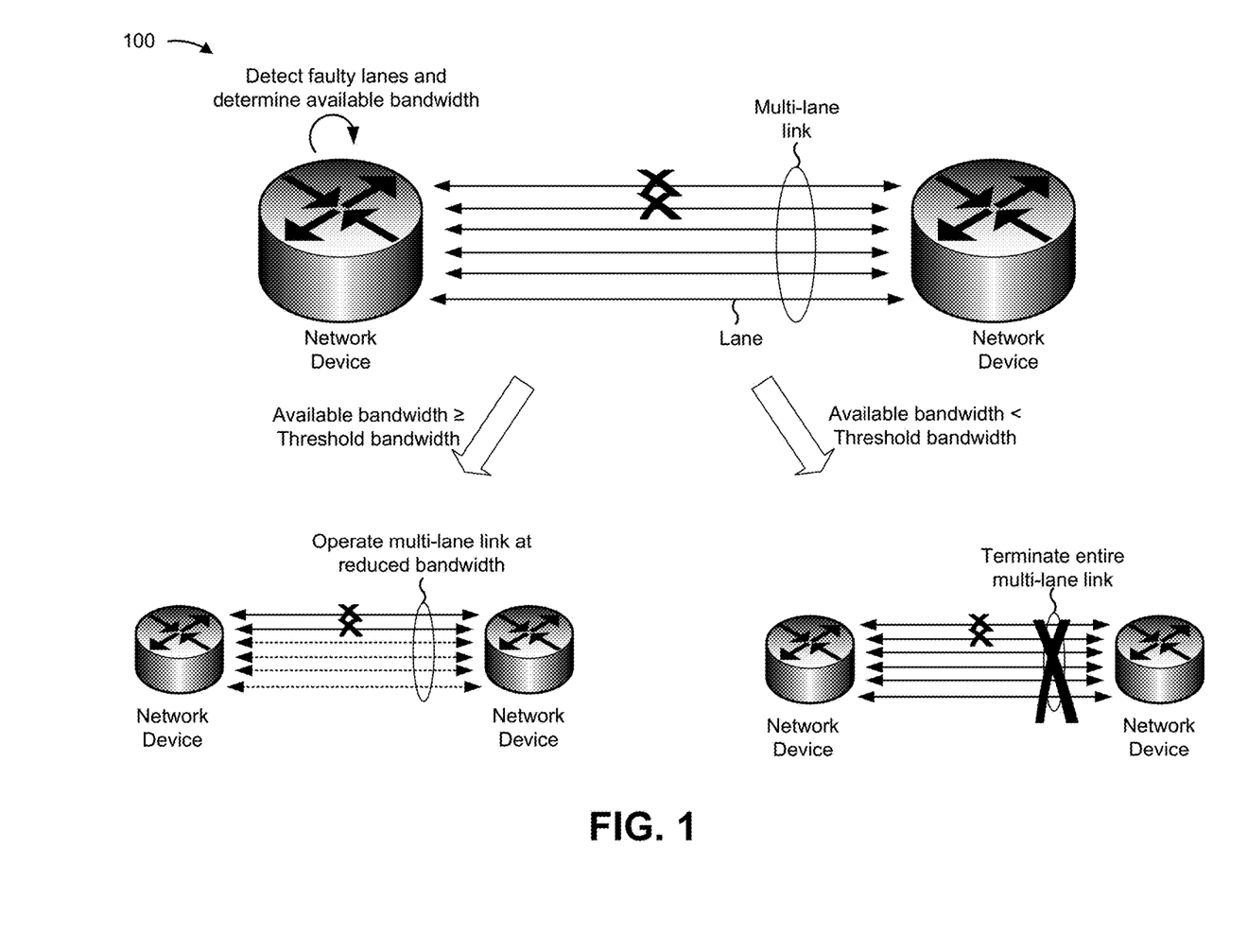
FIG. 1 is a diagram of an overview of an example implementation described herein.

FIG. 1 is a diagram of an overview of an example implementation 100 described herein. In FIG. 1, assume two network devices establish a multi-lane link to communicate data. For example, the multi-lane link may establish links (e.g., logical links) via multiple optical fibers or connections. Furthermore, assume each network device stores threshold bandwidth information indicating a threshold bandwidth that a bandwidth for the multi-lane link may not fall below.

Each network device may detect faulty lanes and communicate information regarding faulty lanes to the other network device, such that the faulty lanes determined by the network devices are synchronized. A faulty lane may be a lane with a particular error rate (e.g., greater than an error rate threshold), a particular power level (e.g., less than a power threshold), and/or a particular signal strength (e.g., less than a signal strength threshold). Each network device may determine an available bandwidth of the multi-lane link based on which lanes are still healthy (e.g., not faulty).

If the available bandwidth satisfies the threshold bandwidth (e.g., the available bandwidth is equal to or greater than the threshold bandwidth), the network devices may distribute the data among the healthy lanes to operate the multi-lane link at the available bandwidth (e.g., a reduced bandwidth). The data may not be distributed to the faulty lanes.

On the other hand, if the available bandwidth fails to satisfy the threshold bandwidth (e.g., the available bandwidth is less than the threshold bandwidth), the network devices may terminate the entire multi-lane link, even though there may still be healthy lanes.

In this way, the network device may allow a multi-lane link to operate at a reduced bandwidth when lanes become faulty without letting the reduced bandwidth fall below a threshold bandwidth.

Figure 2:
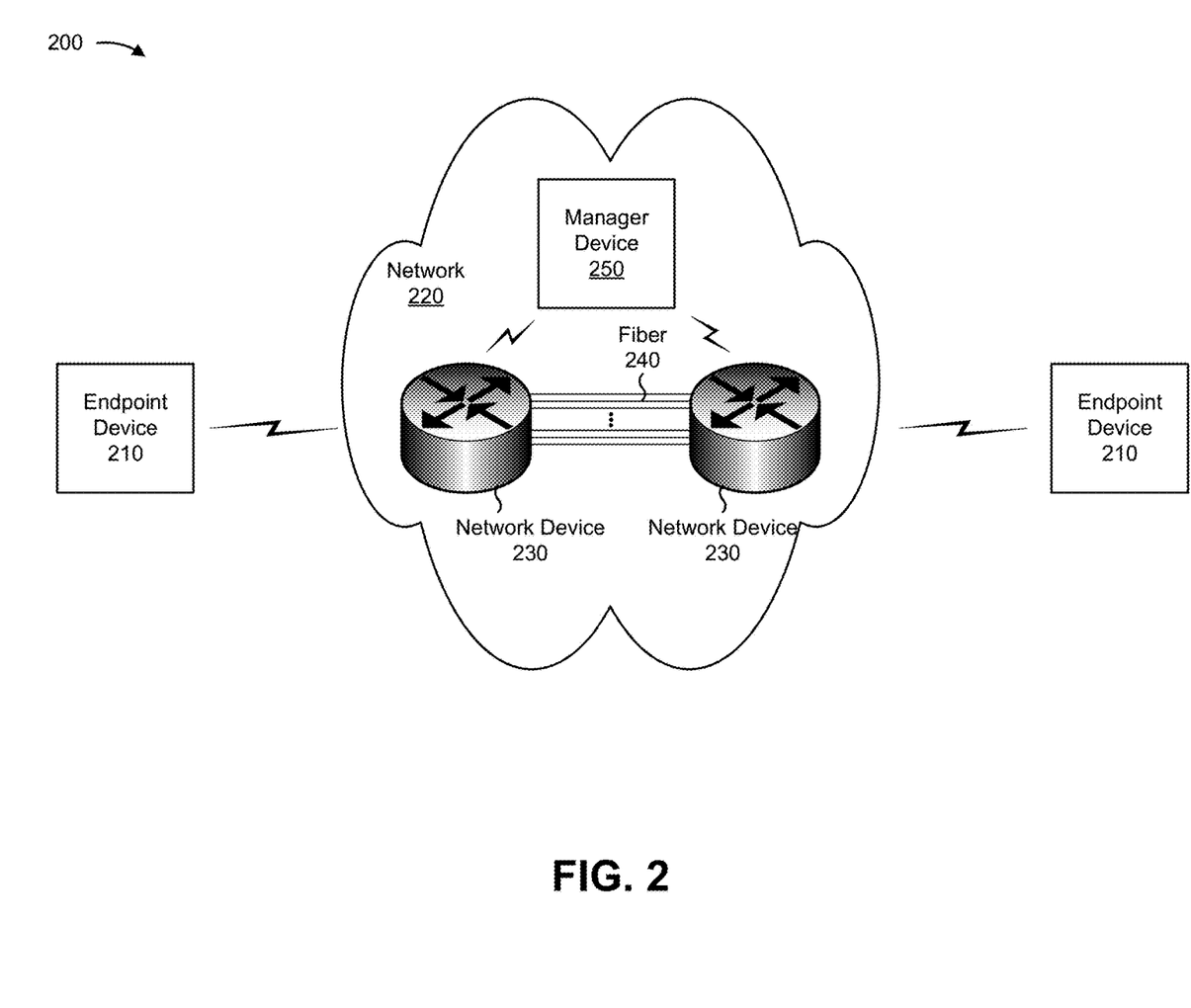
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include endpoint devices 210, a network 220, network devices 230, a fiber 240, and/or a manager device 250. Devices of environment 200 may interconnect via wired connections, wireless connections, or a combination of wired and wireless connections.

Endpoint device 210 may include one or more devices capable of receiving and/or providing information over a network (e.g., network 220), and/or capable of generating, storing, and/or processing information received and/or provided over the network. For example, endpoint device 210 may include a computing device, such as a laptop computer, a tablet computer, a handheld computer, a desktop computer, a super computer, a mobile phone (e.g., a smart phone, a radiotelephone, etc.), a personal digital assistant, a network device (e.g., a router, a gateway, a firewall, a hub, a bridge, etc.), a gaming device, or a similar device. Endpoint device 210 may act as an endpoint (e.g., a source and/or a destination) for a communication with another endpoint device 210. For example, a first endpoint device 210 may provide information to a second endpoint device 210 (e.g., via network device 230 and/or network 220).

Network 220 may include one or more wired and/or wireless networks. For example, network 220 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 220 may include a core network that uses multi-lane gigabit Ethernet technology (e.g., 400 gigabit (400 G) Ethernet, 100 gigabit (100 G) Ethernet, and/or 40 gigabit (40 G) Ethernet). In some implementations, network 220 may allow communication between devices, such as endpoint devices 210. Network 220 may include one or more network devices 230, fibers 240, and/or manager devices 250.

Network device 230 may include one or more devices (e.g., one or more traffic transfer devices) capable of processing and/or transferring traffic between endpoint devices 210. For example, network device 230 may include a firewall, a router, a gateway, a switch, a hub, a bridge, a reverse proxy, a server (e.g., a proxy server), a security device, an intrusion detection device, a load balancer, or a similar device. In some implementations, network device 230 may be included in a core network (e.g., a backbone network that provides paths for the exchange of information between sub-networks) of network 220.

Fiber 240 may include a fiber or wire configured to transmit traffic or data between network devices 230 and/or endpoint devices 210. For example, fiber 240 may include an optical fiber, comprising glass, plastic, and/or another material, used for fiber-optic communication. In some implementations, more than one fiber 240 may connect network devices 230 and/or endpoint devices 210 to allow communication between devices. In some implementations, multiple fibers 240 may be bundled to form a cord (not shown). For example, a 40 G Ethernet cord may include at least eight fibers 240, and a 100 G Ethernet cord may include at least 20 fibers 240.

Manager device 250 may include one or more devices capable of storing, processing, and/or routing information. For example, manager device 250 may include a computing device, such as a desktop computer, a laptop computer, a tablet computer, a server, or the like. In some implementations, manager device 250 may include a communication interface that allows manager device 250 to receive information from and/or transmit information to other devices in environment 200. In some implementations, manager device 250 may manage one or more network devices 230 using a Simple Network Management Protocol (SNMP) and/or another protocol.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
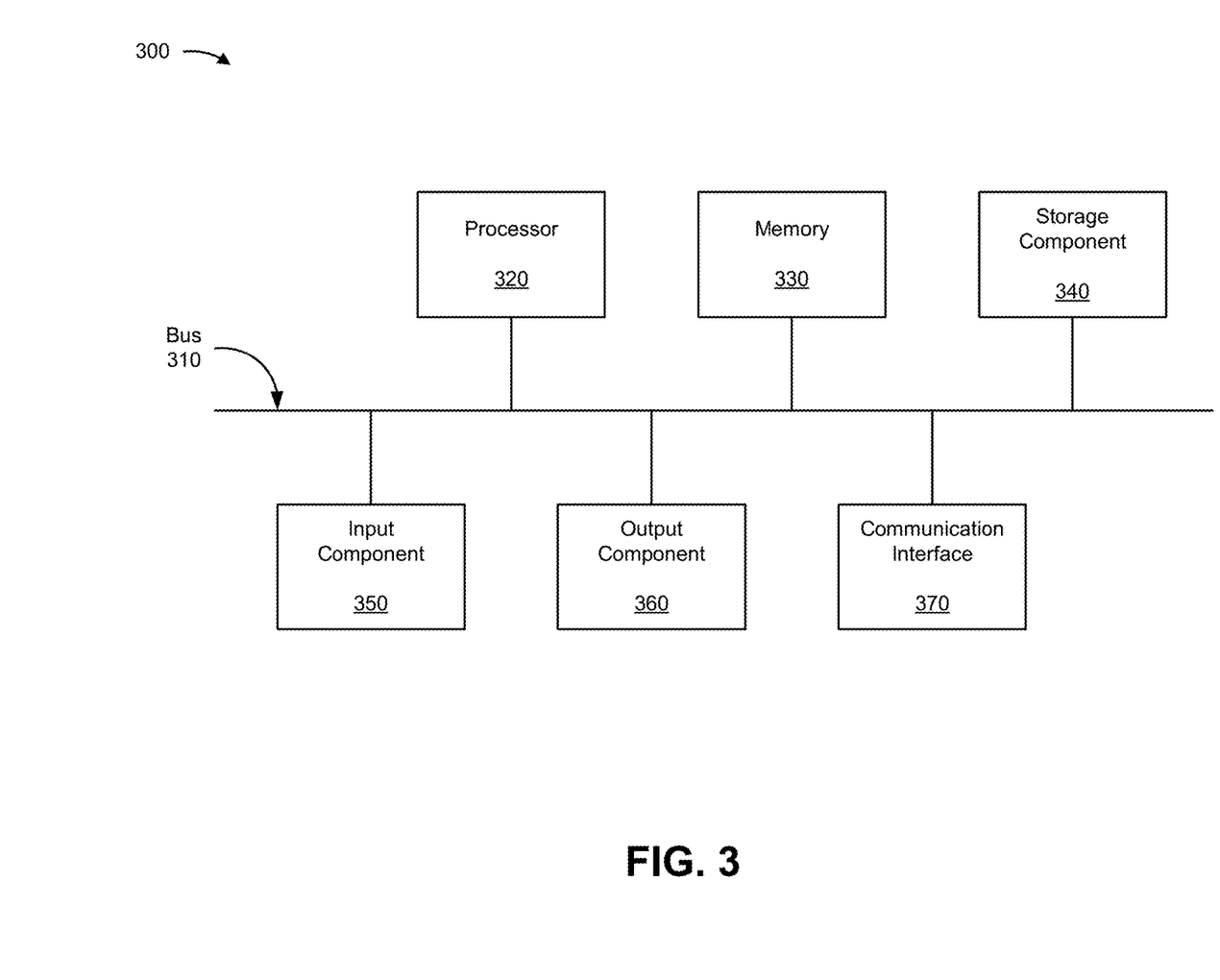
FIG. 3 is a diagram of example components of one or more devices of FIG. 2.

FIG. 3 is a diagram of example components of a device 300. Device 300 may correspond to endpoint device 210, network device 230, and/or manager device 250. In some implementations, endpoint device 210, network device 230, and/or manager device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like. Additionally, or alternatively, communication interface 370 may include a laser, a modulator, and/or another optical component to transmit data on a fiber 240.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
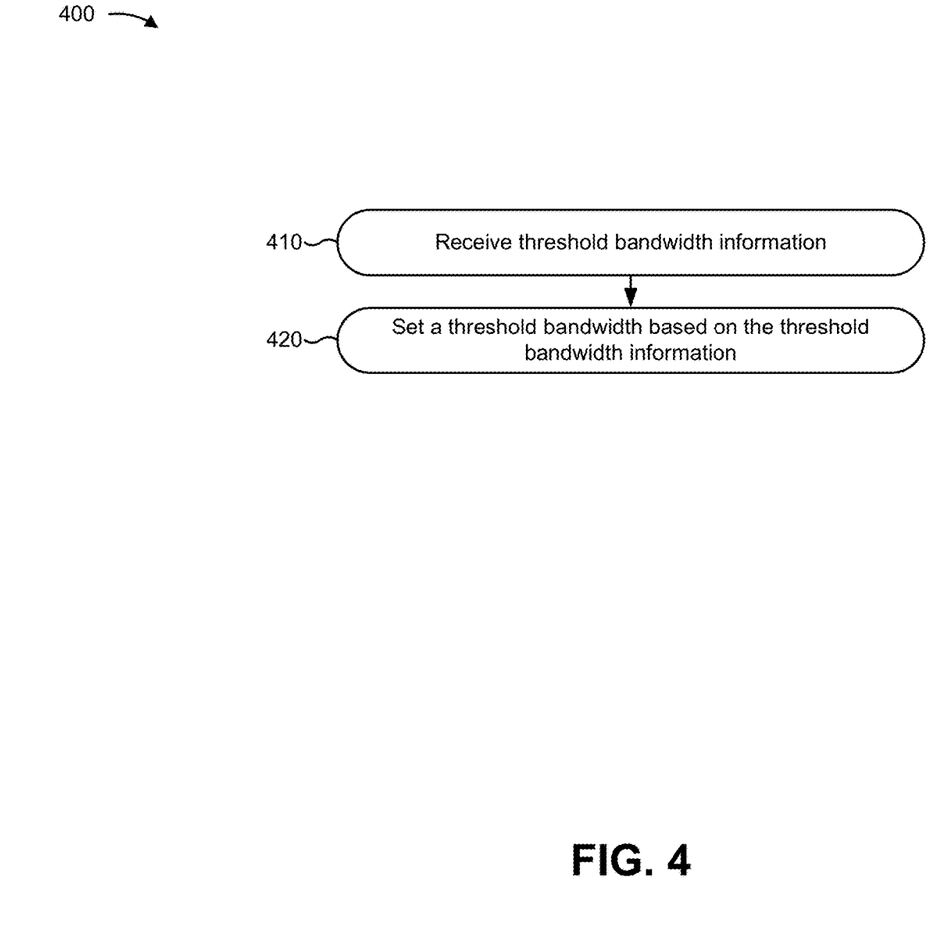
FIG. 4 is a flow chart of an example process for setting a threshold bandwidth.

FIG. 4 is a flow chart of an example process 400 for setting a threshold bandwidth. In some implementations, one or more process blocks of FIG. 4 may be performed by network device 230. In some implementations, one or more process blocks of FIG. 4 may be performed by another device or a group of devices separate from or including network device 230, such as endpoint device 210 and/or manager device 250.

As shown in FIG. 4, process 400 may include receiving threshold bandwidth information (block 410). For example, network device 230 may receive the threshold bandwidth information from manager device 250.

The threshold bandwidth information may be input into manager device 250 by a user responsible for managing network 220. Manager device 250 may send the threshold bandwidth information to network device 230. The threshold bandwidth information may indicate a threshold bandwidth, which may be a minimum permissible bandwidth for a multi-lane link. The threshold bandwidth may be user customizable.

A multi-lane link may include multiple virtual lanes that each operates at a particular bandwidth. Each lane may correspond to a fiber 240 or a pair of fibers 240 (e.g., one fiber 240 for transmitting data via a lane and another fiber 240 for receiving data via the lane). Data transmitted via multiple lanes may be aggregated to increase the total bandwidth with which the data is transmitted. For example, if X number of lanes included in a multi-lane link each has a bandwidth of Y, then the multi-lane link may have a total achievable bandwidth of X*Y. However, the total achievable bandwidth may not always be required and a lower threshold bandwidth may be permitted when one or more of the lanes is faulty, rather than terminating the entire multi-lane link when one or more lanes are faulty.

In some implementations, an internet service provider (ISP) may control network 220. In such a case, the threshold bandwidth may be based on a committed bandwidth (e.g., a committed information rate (CIR)) that the ISP guarantees to maintain between different network devices 220.

As further shown in FIG. 4, process 400 may include setting a threshold bandwidth based on the threshold bandwidth information (block 420). For example, network device 230 may set the threshold bandwidth by storing the threshold bandwidth information. In some implementations, the threshold bandwidth information may be updated and the threshold bandwidth may be changed based on new or updated threshold bandwidth information being received.

In case no threshold bandwidth information is received at block 410, network device 230 may set the threshold bandwidth as the link bandwidth (e.g., the total achievable bandwidth of the multi-lane link) to maintain a legacy operation of the multi-lane link.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
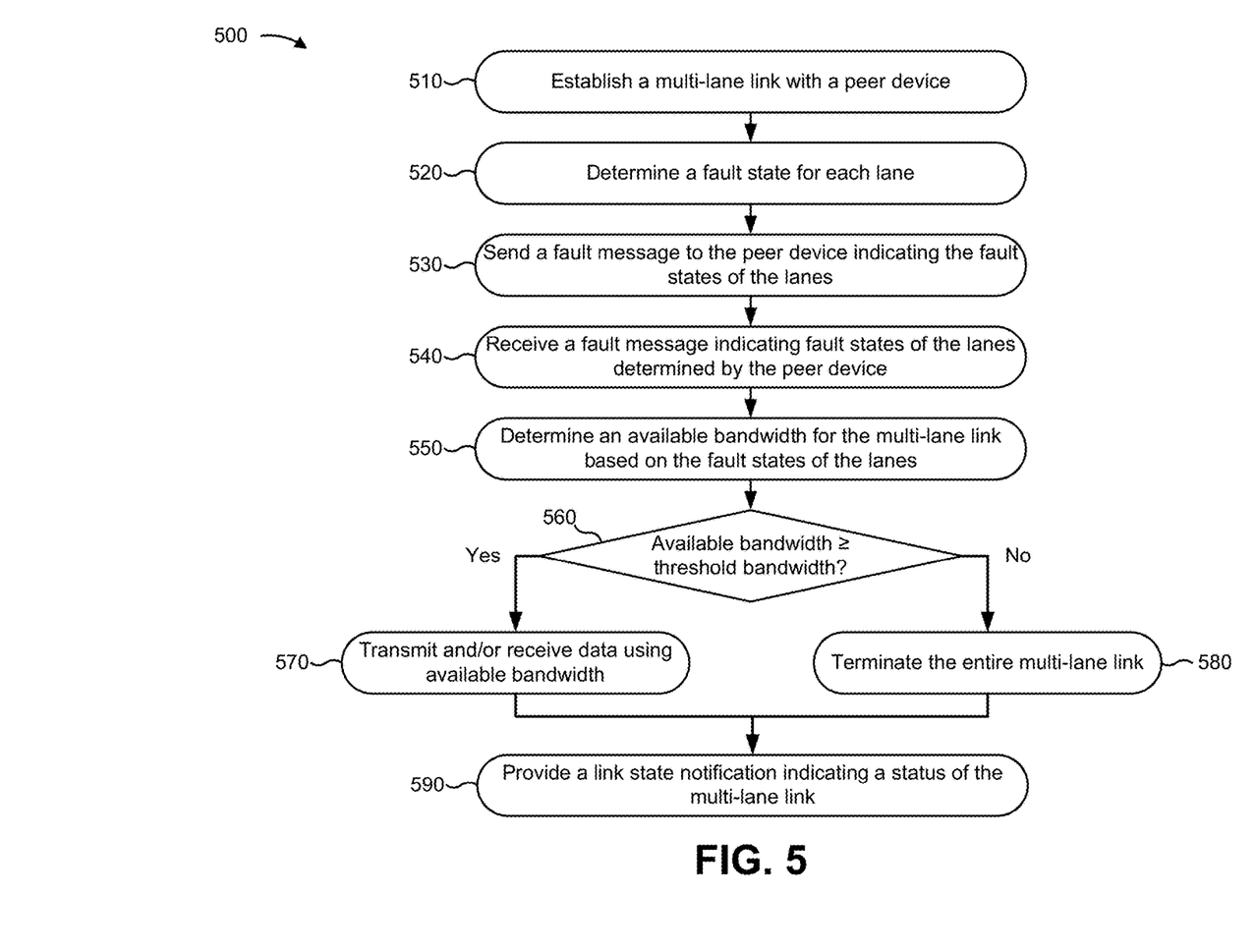
FIG. 5 is a flow chart of an example process for automatically adjusting a bandwidth on a multi-lane link.

FIG. 5 is a flow chart of an example process 500 for automatically adjusting a bandwidth on a multi-lane link. In some implementations, one or more process blocks of FIG. 4 may be performed by network device 230. In some implementations, one or more process blocks of FIG. 4 may be performed by another device or a group of devices separate from or including network device 230, such as endpoint device 210 and/or manager device 250.

As shown in FIG. 5, process 500 may include establishing a multi-lane link with a peer device (block 510). For example, network device 230 may establish the multi-lane link with the peer device. As used herein, the term "peer device" may refer to another network device 230, endpoint device 210, and/or any other device capable of communicating using a multi-lane link.

In some implementations, network device 230 and the peer device may be connected via multiple fibers 240 and use fibers 240 to establish the multi-lane link. Each lane of the multi-lane link may correspond to a fiber 240 or a pair of fibers 240 (e.g., one fiber 240 for transmitting data via a lane and another fiber 240 for receiving data via the lane).

As further shown in FIG. 5, process 500 may include determining a fault state for each lane (block 520). For example, network device 230 may detect the fault state for each lane.

A fault state may include a faulty state or a healthy state. A faulty state may indicate a lane is faulty and may not be used to communicate data. A healthy state may indicate a lane is healthy and may be used to communicate data. In some implementations, a lane may be faulty if one of and/or both fibers 240 in a lane is detected to be faulty.

In some implementations, network device 230 may detect whether a lane is faulty by measuring a power level of a fiber 240 used for the lane. If the power level satisfies a threshold power level, network device 230 may determine the lane is faulty. For example, if the measured power level of a fiber 240 is less than the threshold power level, network device 230 may determine the corresponding lane is in a faulty state. On the other hand, if the measured power level of fiber 240 is greater than or equal to the threshold power level, network device 230 may determine the corresponding lane is in a healthy state.

Additionally, or alternatively, network device 230 may detect whether a lane is faulty by measuring an error rate of data transmitted via the lane. If the measured error rate satisfies a threshold error rate, network device 230 may determine the lane is faulty. For example, if the measured error rate of the lane is greater than the threshold error rate, network device 230 may determine the lane is in a faulty state. On the other hand, if the measured error rate of the lane is less than or equal to the threshold error rate, network device 230 may determine the lane is in a healthy state.

In some implementations, network device 230 may detect whether a lane is faulty by measuring a signal strength of a signal used to communicate data via the lane. If the signal strength satisfies a threshold signal strength, network device 230 may determine the lane is faulty. For example, if the measured signal strength is less than the threshold signal strength, network device 230 may determine the corresponding lane is in a faulty state. On the other hand, if the measured signal strength is greater than or equal to the threshold signal strength, network device 230 may determine the corresponding lane is in a healthy state.

In some implementations, network device 230 may detect faulty optical components associated with a lane. If a faulty optical component is detected, a corresponding lane may be determined to be in a faulty state.

Network device 230 may store fault information, which indicates a fault state for each lane in the multi-lane link, in a memory included in or accessible by network device 230. The fault information may indicate whether each lane is in a faulty state or a healthy state based on the fault state determined by network device 230.

As further shown in FIG. 5, process 500 may include sending a fault message to the peer device indicating the fault states of the lanes (block 530). For example, network device 230 may send the fault message to the peer device.

In some implementations, the fault message may indicate the fault state of each lane. Additionally, or alternatively, the fault message may only indicate the fault states for lanes in a faulty state.

In some implementations, network device 230 may send the fault message at regular intervals. Additionally, or alternatively, network device 230 may send the fault message when a fault state of a lane changes.

In some implementations, network device 230 may send the fault message via the lanes. For example, network device 230 may send the fault message via a particular lane designated to communicate fault messages. Additionally, or alternatively, the fault message may be sent on a lane determined to be healthy. Network device 230 may wait for an acknowledgment from the peer device indicating the fault message was received. If the acknowledgment is not received in a particular amount of time, network device 230 may send the fault message to the peer device on a different lane, and repeat this process until an acknowledgment is received. In some implementations, if an acknowledgement is not received from the peer device (e.g., after sending the fault message on each lane or each healthy lane), then network device 230 may terminate the multi-lane link.

Additionally, or alternatively, network device 230 may send copies of the fault message via each lane to ensure the fault message reaches the peer device and is not transmitted over a faulty lane (e.g., an undetected faulty lane). Additionally, or alternatively, network device 230 may alternate which lane is used to send the fault message. For example, network device 230 may send a first fault message via a first lane, send a second, subsequent, fault message via a second lane, and so on.

In some implementations, network device 230 may transmit the fault message independent of the multi-lane link. For example, network device 230 may transmit the fault message wirelessly and/or via a fiber 240 not used for the multi-lane link.

The fault message may have a particular format that distinguishes the fault message from other data being transmitted via the multi-lane connection, such that the peer device may identify the fault message. The peer device may receive the fault message and update fault information, stored by the peer device, to indicate the fault states of the lanes.

In some implementations, if there is a discrepancy between the fault state for a lane detected by network device 230 and a fault state for the lane detected by the peer device, network device 230 may send a test message to the peer device via the lane to confirm the fault state of the lane. If the peer device receives the test message, returns a test response via the lane, and network device 230 receives the test response, then the lane may be determined to be in a healthy state. On the other hand, if network device 230 does not receive the test response, the lane may be determined to be in a faulty state.

As further shown in FIG. 5, process 500 may include receiving a fault message indicating fault states of the lanes detected by the peer device (block 540). For example, network device 230 may receive the fault message from the peer device.

The peer device may determine fault states of the lanes in the same way as described with respect to block 520. The peer device may also send a fault message to network device 230 in the same way as described with respect to block 530. Network device 230 may receive the fault message from the peer device. The received fault message may indicate fault states determined by the peer device for the lanes.

Network device 230 may update the fault information based on the received fault message. For example, network device 230 may update the fault information to indicate a lane is in a faulty state if either network device 230 or the peer device indicate the lane is faulty. On the other hand, network device 230 may update the fault information to indicate that a lane is in a healthy state if both network device 230 and the peer device indicate that the lane is healthy.

Similarly, the peer device may update fault information stored by the peer device based on the fault message sent by network device 230. Accordingly, the peer device and network device 230 may be synchronized as to which lanes are determined to be faulty.

As further shown in FIG. 5, process 500 may include determining an available bandwidth for the multi-lane link based on the fault states of the lanes (block 550). For example, network device 230 may determine the available bandwidth based on the fault information.

In some implementations, network device 230 may calculate the available bandwidth based on the number of lanes in a healthy state and a bandwidth of each lane in the healthy state. For example, network device 230 may add the bandwidth of each lane in the healthy state together to determine the available bandwidth for the multi-lane link.

Network device 230 may store available bandwidth information, in a memory included in or accessible by network device 230, indicating the available bandwidth for the multi-lane link.

As further shown in FIG. 5, process 500 may include determining whether the available bandwidth satisfies the threshold bandwidth (block 560). For example, network device may determine whether the available bandwidth satisfies the threshold bandwidth by comparing the available bandwidth, indicated by the available bandwidth information, and the threshold bandwidth, indicated by the threshold bandwidth information.

In some implementations, network device 230 may determine the available bandwidth satisfies the threshold bandwidth if the available bandwidth is greater than or equal to the threshold bandwidth. On the other hand, network device 230 may determine the available bandwidth does not satisfy the threshold bandwidth if the available bandwidth is less than the threshold bandwidth.

As further shown in FIG. 5, if the available bandwidth satisfies the threshold bandwidth (block 560—yes), process 500 may include transmitting and/or receiving data using the available bandwidth (block 570). For example, network device 230 may transmit and/or receive data using the healthy lanes. The data may be data being transmitted from a first end device 210 to a second end device 210 via network 220.

In some implementations, when transmitting data to the peer device, network device 230 may distribute the data to the healthy lanes (e.g., using a round-robin scheduling process and/or another scheduling process). Network device 230 may not distribute data to faulty lanes. The peer device may receive the data and combine the data.

In some implementations, when receiving data from the peer device, network device 230 may combine the data received on healthy lanes. If any data is received on faulty lanes, network device 230 may ignore the data received via faulty lanes.

As further shown in FIG. 5, if the available bandwidth does not satisfy the threshold bandwidth (block 560—no), process 500 may include terminating the entire multi-lane link (block 580). For example, network device 230 may terminate the multi-lane link by not communicating data via any of the lanes. Thus, even though there may be healthy lanes available that may be used to transmit the data at a reduced bandwidth, network device 230 may terminate the entire multi-lane link so as not to operate at the reduced bandwidth (e.g., a bandwidth less than a committed bandwidth).

As further shown in FIG. 5, process 500 may include providing a link state notification indicating a status of the multi-lane link (block 590). For example, network device 230 may provide the link state notification.

In some implementations, the link state notification may indicate whether the multi-lane link is active or terminated. Additionally, or alternatively, the link state notification may indicate the bandwidth of the multi-lane link. Additionally, or alternatively, the link state notification may indicate a lane and/or fiber 240 that is faulty.

In some implementations, network device 230 may provide the link state notification using a LED and/or a display device included in network device 230. For example, a LED may emit different colors to indicate whether the multi-lane link is active or terminated, and/or whether the multi-lane link is operating at a reduced bandwidth. Additionally, or alternatively, network device 230 may provide the link state notification by emitting a sound (e.g., an alarm). Accordingly, a person responsible for monitoring network device 230 may be able to determine a status of the multi-lane link based on the link state notification provided by network device 230.

In some implementations, network device 230 may provide the link state notification to manager device 250. For example, network device 230 may send the link state notification using a SNMP trap (e.g., an asynchronous notification from network device 230 to manager device 250). Additionally, or alternatively, network device 230 may provide the link state notification by indicating a change in a command-line interface (CLI).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
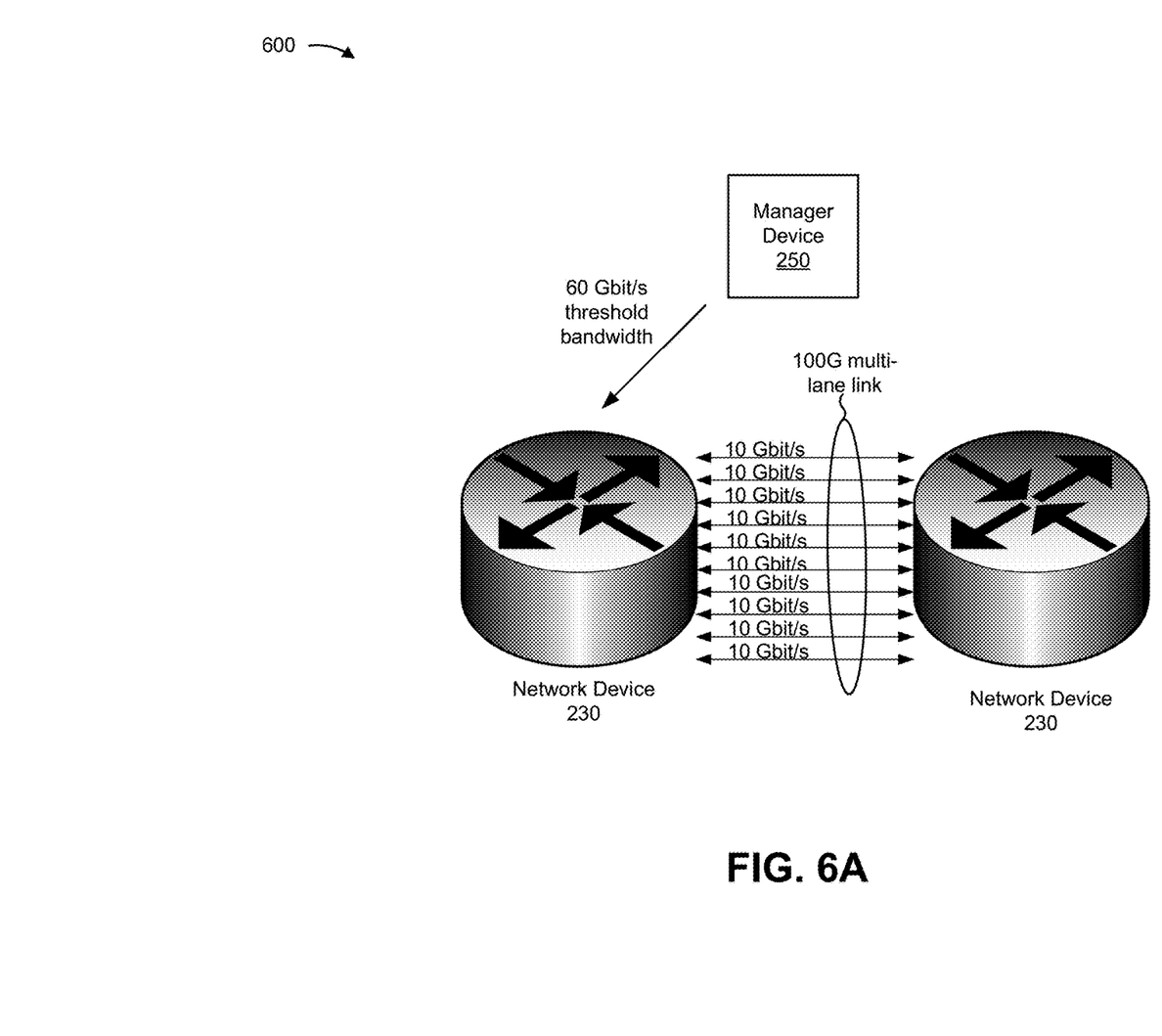
FIGS. 6A-6C are diagrams of an example implementation relating to the example processes shown in FIGS. 4 and 5.
Figure 6B:
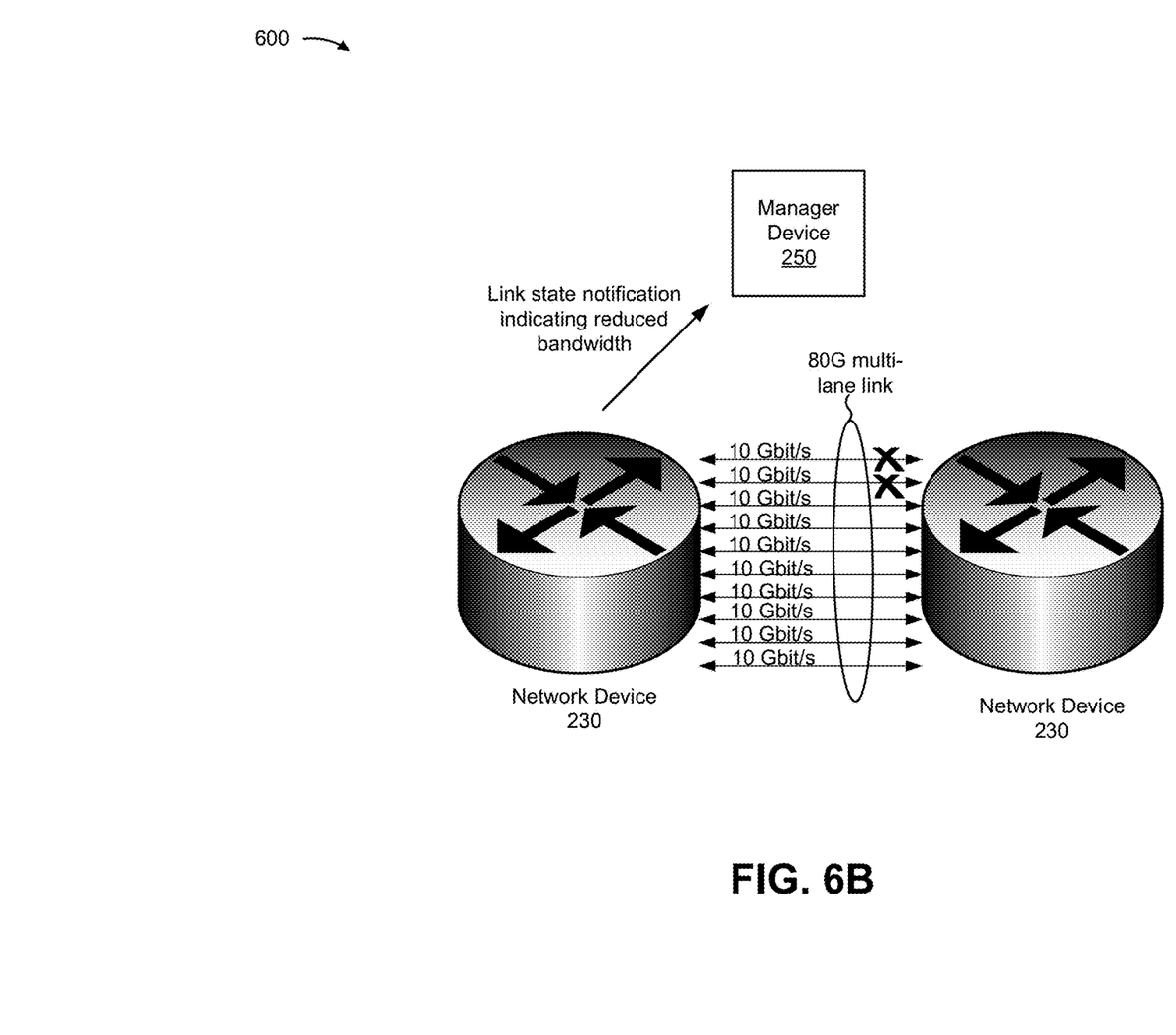
Figure 6C:
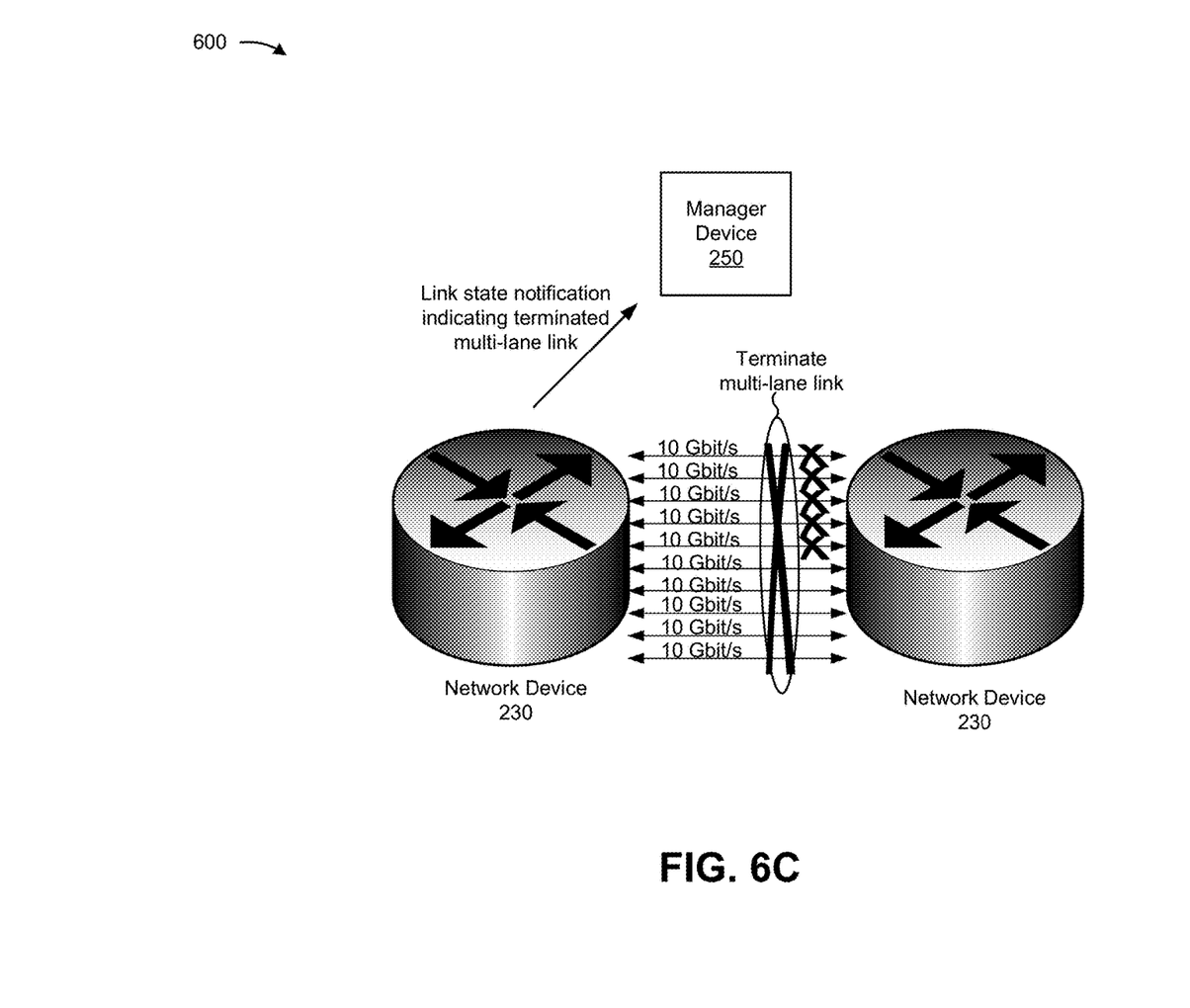

FIGS. 6A-6C are diagrams of an example implementation 600 relating to example process 400 shown in FIG. 4 and example process 500 shown in FIG. 5. FIGS. 6A-6C show an example of setting a threshold bandwidth and automatically adjusting a bandwidth on a multi-lane link.

In FIG. 6A, assume a user inputs threshold bandwidth information into manager device 250. Further, assume the threshold information indicates a threshold bandwidth of 60 Gbit/s for a multi-lane link. Manager device 250 sends the threshold bandwidth information to network device 230 and network device 230 receives the threshold bandwidth information.

As shown in FIG. 6A, assume that network device 230 establishes a 100 G multi-lane link with another network device 230 (e.g., a peer device). Also, assume that the 100 G multi-lane link may use ten lanes that each has a bandwidth of 10 Gbit/s.

In FIG. 6B, assume network device 230 determines that two of the ten lanes are faulty. For example, network device 230 may detect that a signal strength for the two lanes (e.g., of a signal transmitted via fiber 240) is below a threshold value for a healthy lane. Network device 230 may send a fault message to the other network device 230 indicating that the two lanes are faulty and that the other eight lanes are healthy. The other network device 230 may receive the fault message and send network device 230 another fault message confirming that the other network device 230 also determined that the two lanes are faulty and the other lanes are healthy.

Thus, network device 230 may determine that the available bandwidth for the multi-lane link is 80 Gbit/s (e.g., 10 Gbit/s/lane*8 healthy lanes=80 Gbit/s). Network device 230 may determine that the available bandwidth (80 Gbit/s) is greater than the threshold bandwidth (60 Gbit/s). Accordingly, network device 230 may keep the multi-lane link active, with a reduced bandwidth of 80 Gbit/s, by distributing the data to the eight healthy lanes. Network device 230 may not distribute any data to the two faulty lanes.

As further shown in FIG. 6B, network device 230 may send a link state notification to manager device 250 (e.g., via a SNMP trap) indicating the multi-lane link is active and operating at 80 Gbit/s.

In FIG. 6C, assume network device 230 later determines that five of the ten lanes are faulty. For example, network device 230 may detect that a signal strength for the lanes (e.g., of a signal transmitted via fiber 240) is below a threshold value for a healthy lane. Network device 230 may send a fault message to the other network device 230 indicating that the five lanes are faulty and that the other five lanes are healthy. The other network device 230 may receive the fault message and send network device 230 another fault message confirming that the other network device 230 also determined that the five lanes are faulty and the other five lanes are healthy.

Thus, network device 230 may determine that the available bandwidth for the multi-lane link is 50 Gbit/s (e.g., 10 Gbit/s/lane*5 healthy lanes=50 Gbit/s). Network device 230 may determine that the available bandwidth (50 Gbit/s) is less than the threshold bandwidth (60 Gbit/s). Accordingly, network device 230 may terminate the entire multi-lane link so that the multi-lane link does not operate at a bandwidth less than the threshold bandwidth.

As further shown in FIG. 6C, network device 230 may send a link state notification to manager device 250 (e.g., via a SNMP trap) indicating the multi-lane link has been terminated due to five lanes being faulty.

As indicated above, FIGS. 6A-6C are provided merely as an example. Other examples are possible and may differ from what was described with regard to FIGS. 6A-6C.

Implementations described herein may allow a multi-lane link to operate at a reduced bandwidth when lanes become faulty. However, in some implementations, the multi-lane link may be terminated if an available bandwidth fails to satisfy a threshold bandwidth, thus ensuring the multi-lane link operates at a satisfactory bandwidth. Furthermore, implementations described herein may provide a notification on the status of the multi-lane link to notify a user of the status of the multi-lane link.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A first device, comprising:
a memory; and
one or more processors to:
    establish a multi-lane link with a second device,
        the multi-lane link including a plurality of lanes used to communicate data with the second device;
    determine fault states for the plurality of lanes included in the multi-lane link,
        a fault state, of the fault states, for a lane, of the plurality of lanes, indicating whether the lane is faulty,
        the plurality of lanes including at least one available lane and at least one faulty lane;
    receive second device-determined fault states for the plurality of lanes, as determined by the second device;
    determine that a particular determined fault state, of the determined fault states, is different than a particular second device-determined fault state, of the second device-determined fault states, the particular determined fault state and the particular second device-determined fault state being associated with a particular lane of the plurality of lanes;

determine that the particular lane is in a healthy state based on determining that the particular determined fault state is different than the particular second device-determined fault state;

determine an available bandwidth for the multi-lane link by adding a bandwidth of the particular lane to a total bandwidth of one or more other lanes, of the plurality of lanes, that are in the healthy state;

selectively terminate the multi-lane link based on whether the available bandwidth satisfies a threshold bandwidth with which the multi-lane link is permitted to operate; and provide a link state notification indicating a status of the multi-lane link based on selectively terminating the multi-lane link,
the link state notification indicating whether the multi-lane link is terminated.

2. The first device of claim 1, where the one or more processors are further to:
measure a plurality of signal strengths of a plurality of signals used to communicate data via the plurality of lanes; and
determine the fault states of the plurality of lanes based on the plurality of signal strengths.

3. The first device of claim 1, where the one or more processors are further to:
detect faulty optical components associated with the plurality of lanes; and
determine the fault states of the plurality of lanes based on detecting the faulty optical components.

4. The first device of claim 1, where the one or more processors, when determining that the particular lane is in the healthy state, are to:
receive a test response from the second device via the particular lane based on sending a test message; and
determine that the particular lane is in the healthy state based on receiving the test response.

5. The first device of claim 1, where the one or more processors are further to:
update fault information based on determining that the particular lane is in the healthy state,
the fault information indicating that the particular lane is in the healthy state.

6. The first device of claim 1, where the one or more processors, when providing the link state notification, are to:
provide the link state notification via a light-emitting diode (LED) included in the first device,
the LED to emit different colors to indicate whether the multi-lane link is terminated.

7. The first device of claim 1, where the one or more processors are further to:
measure a plurality of error rates of a plurality of signals used to communicate data via the plurality of lanes; and
determine the fault states of the plurality of lanes based on the plurality of error rates.

8. A non-transitory computer-readable medium storing instructions, the instructions comprising:
one or more instructions that, when executed by one or more processors, cause the one or more processors to:
establish a multi-lane link with a device,
the multi-lane link including a plurality of lanes used to communicate data with the device;
determine fault states for the plurality of lanes included in the multi-lane link,
the plurality of lanes including at least one available lane and at least one faulty lane;
receive device-determined fault states for the plurality of lanes, as determined by the device;
determine that a particular determined fault state, of the determined fault states, is different than a particular device-determined fault state, of the device-determined fault states,
the particular determined fault state and the particular device-determined fault state being associated with a particular lane of the plurality of lanes, and
the particular lane having a particular fault state;
determine that the particular lane is in a healthy state based on determining that the particular determined fault state is different than the particular device-determined fault state;
determine an available bandwidth for the multi-lane link by adding a bandwidth of the particular lane to a total bandwidth of one or more other lanes, of the plurality of lanes, that are in the healthy state;
selectively terminate or operate the multi-lane link at the available bandwidth based on whether the available bandwidth satisfies a threshold bandwidth; and
provide a link state notification indicating a status of the multi-lane link based on selectively terminating or operating the multi-lane link,
the link state notification indicating whether the multi-lane link is terminated or operating.

9. The non-transitory computer-readable medium of claim 8,
where the one or more instructions, that cause the one or more processors to selectively operate the multi-lane link, cause the one or more processors to:
operate the multi-lane link based on the available bandwidth satisfying the threshold bandwidth, and
distribute the data to a plurality of healthy lanes, of the plurality of lanes, using a round-robin scheduling process based on operating the multi-lane link; and
where the one or more instructions, that cause the one or more processors to selectively terminate the multi-lane link, cause the one or more processors to:
terminate the multi-lane link by not communicating the data via any of the plurality of lanes.

10. The non-transitory computer-readable medium of claim 8, where the one or more instructions, that cause the one or more processors to provide the link state notification, cause the one or more processors to:
emit an alarm to indicate whether the multi-lane link is terminated or operating.

11. The non-transitory computer-readable medium of claim 8, where the one or more instructions, that cause the one or more processors to provide the link state notification, cause the one or more processors to:
provide the link state notification via a display device to indicate whether the multi-lane link is terminated or operating.

12. The non-transitory computer-readable medium of claim 8, where the one or more instructions, when executed by the one or more processors, further cause the one or more processors to:
measure a plurality of signal strengths of a plurality of signals used to communicate the data via the plurality of lanes; and
determine the fault states of the plurality of lanes based on the plurality of signal strengths.

13. The non-transitory computer-readable medium of claim 8, where the one or more instructions, when executed by the one or more processors, further cause the one or more processors to:
- detect faulty optical components associated with the plurality of lanes; and
- determine the fault states of the plurality of lanes based on detecting the faulty optical components.

14. The non-transitory computer-readable medium of claim 8, where the one or more instructions further cause the one or more processors to:
- measure a plurality of error rates of a plurality of signals used to communicate data via the plurality of lanes; and
- determine the fault states of the plurality of lanes based on the plurality of error rates.

15. A method, comprising:
- establishing, by a first device, a multi-lane link with a second device,
  - the multi-lane link including a plurality of lanes used to communicate data with the second device;
- determining, by the first device, fault states for the plurality of lanes included in the multi-lane link,
  - the plurality of lanes including at least one available lane and at least one faulty lane;
- receiving, by the first device, second device-determined fault states for the plurality of lanes, as determined by the second device;
- determining, by the first device, that a particular determined fault state, of the determined fault states, is different than a particular second device-determined fault state, of the second device-determined fault states,
  - the particular determined fault state and the particular second device-determined fault state being associated with a particular lane of the plurality of lanes,
  - the particular lane having a particular fault state;
- determining, by the first device, that the particular lane is in a healthy state based on determining that the particular determined fault state is different than the particular second device-determined fault state;
- determining, by the first device, an available bandwidth for the multi-lane link by adding a bandwidth of the particular lane to a total bandwidth of one or more other lanes, of the plurality of lanes, that are in the healthy state;
- selectively operating, by the first device, the multi-lane link based on whether the available bandwidth satisfies a threshold bandwidth with which the multi-lane link is permitted to operate; and
- providing, by the first device, a link state notification indicating a status of the multi-lane link based on selectively operating the multi-lane link,
  - the link state notification indicating whether the multi-lane link is operating.

16. The method of claim 15, where determining that the particular lane is in the healthy state comprises:
- receiving a test response from the second device via the particular lane based on sending a test message; and
- determining that the particular lane is in the healthy state based on receiving the test response.

17. The method of claim 16, further comprising:
- updating fault information based on determining that the particular lane is in the healthy state,
  - the fault information indicating that the particular lane is in the healthy state.

18. The method of claim 15, where selectively operating the multi-lane link comprises:
- operating the multi-lane link based on the available bandwidth satisfying the threshold bandwidth; and
- distributing the data to a plurality of healthy lanes, of the plurality of lanes, using a round-robin scheduling process based on operating the multi-lane link.

19. The method of claim 15, where providing the link state notification comprises:
- providing the link state notification via a light-emitting diode (LED) included in the first device,
  - the LED to emit different colors to indicate whether the multi-lane link is operating.

20. The method of claim 15, where providing the link state notification comprises:
- emitting an alarm to indicate whether the multi-lane link is operating.

* * * * *